Jan. 17, 1933.     G. W. DE BELL     1,894,582
RETRACTABLE LANDING GEAR
Filed Oct. 22, 1931     3 Sheets-Sheet 3
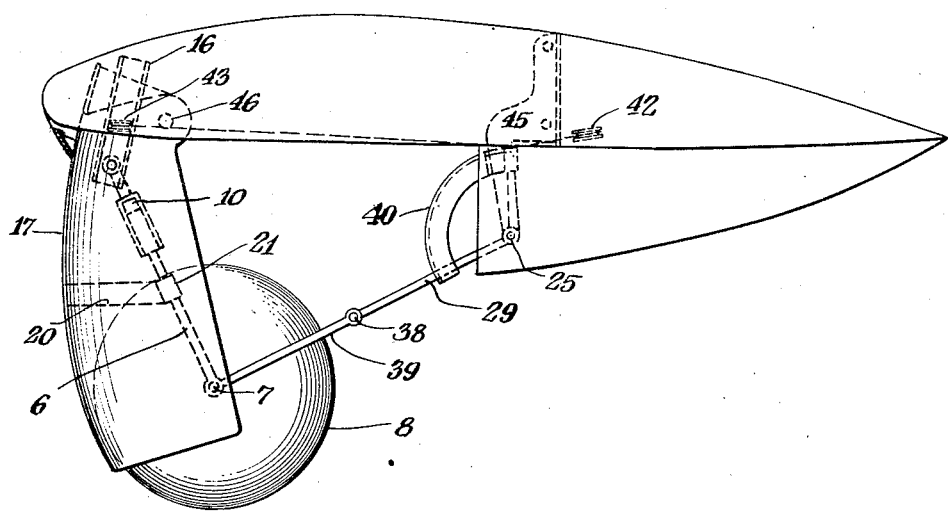
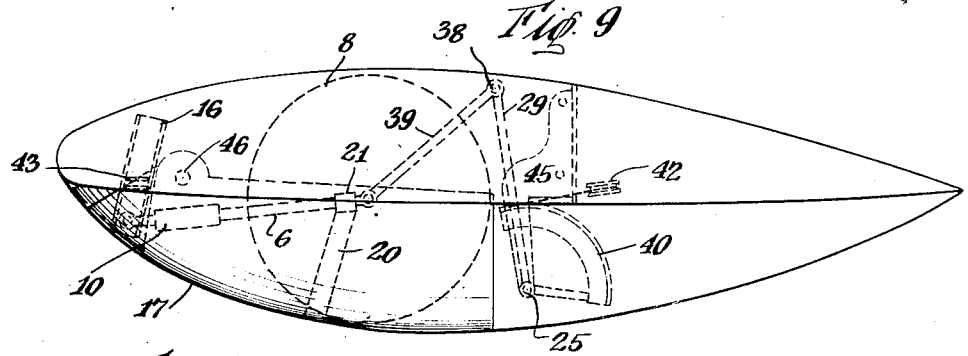
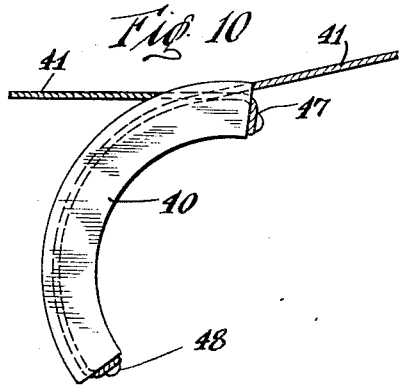
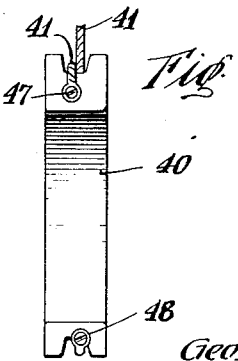
INVENTOR
George W. De Bell
BY
Hoguet & Neary
ATTORNEYS Patented Jan. 17, 1933

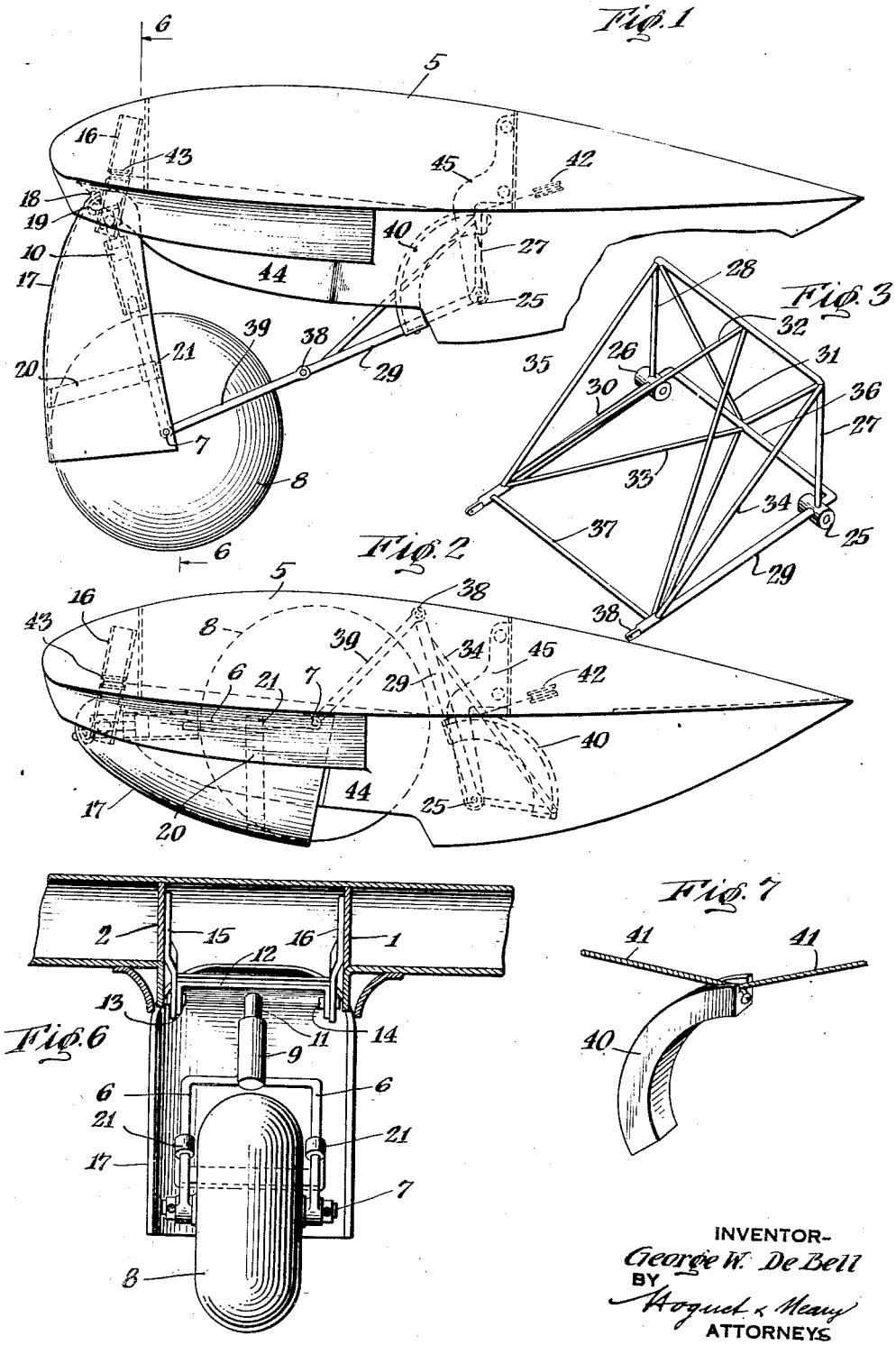

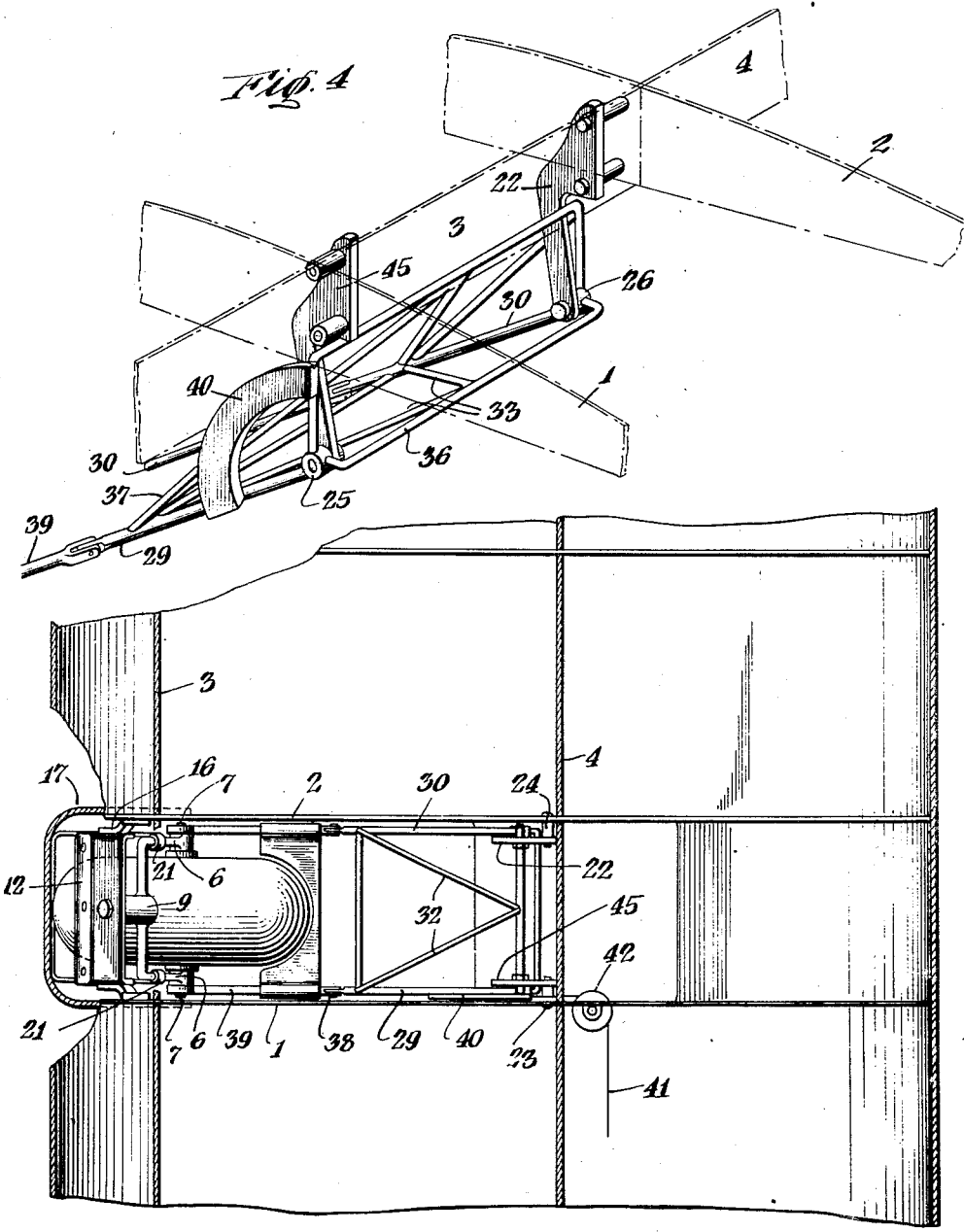

1,894,582

UNITED STATES PATENT OFFICE

GEORGE W. DE BELL, OF FARMINGDALE, NEW YORK, ASSIGNOR TO THE AVIATION PATENT AND RESEARCH CORPORATION, OF NEW YORK, N. Y., A CORPORATION OF NEW YORK

RETRACTABLE LANDING GEAR

Application filed October 22, 1931. Serial No. 570,359.

This invention relates to rectractable landing gear for aircraft, and has for its object the provision of such a landing gear that may be readily retracted into an enclosure, such as a wing, stub wing, fuselage, pontoon, or flying boat hull, and also the provision of a fairing for the landing gear when extended, and for the completion of the streamline of the enclosure when the landing gear is in retracted position.

Other objects are to provide a retractable landing gear having a shock absorbing strut which may be so mounted on a stub wing that only the minimum alteration of the stub wing spars is necessary and so as to reduce side drag on the spars due incidental to the landing of the aircraft.

A further object is the provision of a strong and simple landing gear and a convenient operating system for retracting the same and further means for retaining it in its adjusted positions.

With the foregoing and other objects in view, the invention consists in the combination of parts and in the details of construction hereinafter set forth in the following description and appended claims, certain embodiments being illustrated in the accompanying drawings, in which:

Figure 1 is a side elevation of a stub wing and retractable landing gear attached thereto and in extended position.

Figure 2 is a view similar to Figure 1 with the landing gear in retracted position.

Figure 3 is a detail view in perspective of a portion of the landing gear.

Figure 4 is a detail view in perspective of a portion of the landing gear and of the wing with the covering removed showing the manner of attachment of the landing gear to the wing ribs.

Figure 5 is a plan view of the same as shown in Figure 4 except that the landing gear is in extended position.

Figure 6 is a view in section taken along line 6—6 of Figure 1.

Figure 7 is a detail view of an arcuate plate for carrying the landing gear struts and operating cable.

Figure 8 is a view similar to Figure 1 showing a modified form of that shown in Figure 1 in which the cowling is adapted to complete the streamline;

Figure 9 is a view similar to Figure 2 of the same modified form as shown in Figure 8 with the cowling in retracted position;

Figure 10 is a view similar to Figure 7 showing the operating cables in full and dotted lines;

Figure 11 is a rear end view of that shown in Figure 10.

Referring more particularly to the drawings, the front strut of the landing gear is connected indirectly to and between two ribs 1 and 2 adjacent the front spar 3 of the stub wing 5 while the rear landing gear struts are also indirectly connected to and between the same ribs adjacent the rear spar 4.

The front strut comprises a pair of legs 6 supporting the axle 7 for the wheel 8 and joining above the wheel to support an integral cylinder section 9 of an oleo shock absorber. The upper section comprises a piston 10 and a connecting leg 11 carried by a cross piece 12 pivotally connected at 13 and 14 to supporting arms 15 and 16 attached to and supported by ribs 1 and 2 adjacent the front spar 3.

A cowling 17 of streamline form is provided for the landing gear assembly and may be connected at its upper end at a point such as indicated at 18 to a flange 19 carried by the front strut, and is further provided with a pair of arms 20 having loops 21 for encircling legs 6 in sliding relation. While the upper end of cowling 17 is shown as mounted on the same pivot center as the front strut, this is not necessarily so as the cowling may also be mounted on a separate center such as shown at 46 in Figures 8 and 9 so as to obtain a complete and better streamline effect when the landing gear is in retracted position as indicated in Figure 9. The oleo shock absorber allows for certain vertical movement of the wheel and the cowling covers the wheel only to such an extent that it will not engage the ground when the shock absorber is fully compressed. The pivotal attachment of the landing gear at 13 and 14 thus allows for pivotal movement of the landing gear and cowling from the position shown in Figure 1 to that shown in Figure 2, subject however to the remaining part of the landing gear and control which will now be described.

Supporting arms 45 and 22 connected at 23 and 24 to the ribs 1 and 2 supply pivots 25 and 26 for angularly disposed and integrally associated pairs of landing gear struts 27, 28, and 29, 30, interbraced by V struts 31, 32, 33 diagonal struts 34 and 35, and cross struts 36 and 37 to form an interbraced carriage. To struts 29 and 30 are pivotally connected struts extending to the wheel axle, strut 29 being shown pivotally connected to strut 39 which pivots on the wheel axle 7.

Any number of types of operating mechanism, such as hydraulic, worm and sector, push rod, leverage, or cable and pulley systems may be employed for retracting and extending the landing gear. For purposes of illustration, a cable and pulley system is described:

In order to retract the landing gear an arcuate plate 40 is provided to engage struts 27 and 29 and to the plate at 47 and 48 are attached the two ends of a cable 41 which passes over a series of pulleys, such as shown at 42 and 43, to a suitable hand control, a movement of which in one direction will cause a clockwise rotation of the plate and the two pairs of struts 27, 29 and 28, 30 and an opposite movement of the control causing the converse to occur.

The invention has been described in connection with a stub wing which may have a metallic lower casing 44 extending down beneath the wing and be of a suitable streamline form. This lower casing need be only slightly greater in width than the landing gear assembly and of any suitable length to accommodate the working parts of the landing gear and control, as the lower outer skin of the wing to which the lower casing is attached may be removed so that the wing proper and the lower casing are communicating.

As said before a pull on the cable causes the struts 27, 29 and 28, 30 to swing clockwise and pull struts 39 and 6 about pivots 38 and 7 until the whole assembly takes the position shown in Figure 2, the cowling following by means of the sliding loops 21 until it completes the streamline form of the lower casing.

Obviously this principle of construction and operation is equally applicable to wing construction whether or not a stub wing is used. Furthermore the wing may be of such thickness that the lower casing may be dispensed with and the streamline cowling be adapted to lay adjacent to the wing. The principle of construction and operation is likewise adaptable for use in connection with flying boats in which it may be desired to retract the landing gear into the hull, or in which case the landing gear may be mounted in sponsons.

Thus, it will be seen that there has been provided a landing gear with shock absorbing struts, with a streamline cowling and with positively and simply operating control mechanism which may be readily retracted into a wing enclosure and extended to normal position for landing, and which is itself braced and also further braced by its connection to the wing construction so as to reduce any tendency toward side drag on the wing spars themselves incident to the landing of the aircraft.

I claim:

1. A retractable landing gear for aircraft comprising a cowling therefor which is slidably movable with and relatively to said landing gear into extended and retracted positions, so as to provide a streamlined protecting shield for substantially all of the landing gear when in extended and retracted position.

2. A retractable landing gear for aircraft comprising a shock absorbing strut and a cowling for said landing gear which is slidably movable with and relatively to said landing gear into extended and retracted positions, so as to provide a streamlined protecting shield for substantially all of the landing gear when in extended and retracted position.

3. A retractable landing gear for aircraft comprising a shock absorbing strut and a cowling for said landing gear which is movable with said landing gear into extended and retracted positions, so as to provide a streamlined protecting shield for substantially all of the landing gear when in extended and retracted position said cowling being pivotally mounted on said aircraft and so connected to said landing gear as to allow relative sliding movement between said cowling and the latter when extended and during the retraction thereof.

4. A retractable landing gear for aircraft comprising a shock absorbing strut and a cowling for said landing gear which is slideably movable with and relatively to said landing gear into extended and retracted positions, so as to provide a streamlined protecting shield for substantially all of the landing gear when in extended and retracted position a plurality of other landing struts, an operating member carried thereby, manually controlled means for moving said member, and means for limiting the movement of said landing gear during its retraction.

5. In an airplane, a landing gear retractable within the wings thereof and provided with a cowling, said cowling being slideably movable with and relatively to said landing gear into extended and retracted positions, so as to provide a streamlined shield for substantially all of said landing gear in extended and retracted positions and in the latter position to substantially complete the streamline form of said wings.

6. In an airplane having stub wings, a landing gear retractable within the general confines of said stub wings and provided with a cowling slidably movable therewith and relatively thereto into extended and retracted position and also adapted to conform to the streamline form of said stub wing when said cowling and landing gear are in retracted position, so as to provide a streamlined protecting shield for substantially all of the landing gear when in extended and retracted position.

7. In an airplane, a landing gear retractable within the wings thereof and provided with a cowling, said cowling being slidably movable with said landing gear into extended and retracted positions so as to provide a streamlined protecting shield for substantially all of the landing gear when in extended and retracted position, said cowling being pivotally mounted on said aircraft and so connected to said landing gear as to allow relative sliding movement between said cowling and latter when extended and during the retraction thereof.

8. In an airplane having stub wings, a landing gear retractable within the general confines of said stub wings and provided with a cowling movable therewith into extended and retracted position and also adapted to conform to the streamline form of said stub wing when said cowling and landing gear are in retracted position so as to provide a streamlined protecting shield for substantially all of the landing gear when in extended and retracted position, said cowling being pivotally mounted on said aircraft and so connected to said landing gear as to allow relative sliding movement between said cowling and the latter when extended and during the retraction thereof.

9. In an airplane, a landing gear retractable within the wings thereof and provided with a cowling, said cowling being movable with and relatively to said landing gear into extended and retracted positions so as to provide a streamlined protecting shield for substantially all of the landing gear when in extended and retracted position, said cowling being pivotally mounted on said aircraft and so connected to said landing gear as to allow relative sliding movement of the latter when extended and during the retraction thereof, a plurality of other landing struts, an operating member carried thereby, manually controlled means for moving said member, and means for limiting the movement of said landing gear during its retraction.

10. In an airplane having stub wings, a landing gear retractable within the general confines of said stub wings and provided with a cowling movable therewith into extended and retracted position and also adapted to conform to the streamline form of said stub wing when said cowling and landing gear are in retracted position, said cowling being pivotally mounted on said aircraft and so connected to said landing gear as to allow relative sliding movement between said cowling and the latter when extended and during the retraction thereof, a plurality of other landing struts, an operating member carried thereby, manually controlled means for moving said member so as to provide a streamlined protecting shield for substantially all of the landing gear when in extended and retracted position, and means for limiting the movement of said landing gear during its retraction.

11. A retractable landing gear for aircraft, comprising a cowling therefor which is slidably movable with and relatively to said landing gear as the latter is extended beyond or retracted within an enclosure so as to provide a streamlined protecting shield for substantially all of the landing gear when in extended and retracted position.

In testimony whereof, I have signed my name to this specification, this 20th day of October, 1931.

GEORGE W. DE BELL.